United States Patent [19]

Mortimore et al.

[11] Patent Number: 5,010,586

[45] Date of Patent: Apr. 23, 1991

[54] OPTICAL TWO-WAY TRANSMISSION SYSTEM WITH LOOP REFLECTOR MODULATOR

[75] Inventors: David B. Mortimore, Felixstowe; David B. Payne, Wickham Market, both of England

[73] Assignee: British Telecommunications public limited company, England

[21] Appl. No.: 288,251

[22] PCT Filed: Apr. 14, 1988

[86] PCT No.: PCT/GB88/00291

§ 371 Date: Dec. 13, 1988

§ 102(e) Date: Dec. 13, 1988

[87] PCT Pub. No.: WO88/08232

PCT Pub. Date: Oct. 20, 1988

[30] Foreign Application Priority Data

Apr. 15, 1987 [GB] United Kingdom ............... 8709072

[51] Int. Cl.$^5$ ........................................... H04B 10/12
[52] U.S. Cl. ................................. 455/605; 455/612
[58] Field of Search ............ 455/600, 604, 605, 606, 455/607, 612, 611, 617, 618; 370/3, 1

[56] References Cited

U.S. PATENT DOCUMENTS 4,715,028 12/1987 McMahon ............................... 370/3
4,730,301 3/1988 McMahon ............................... 370/3
4,742,576 5/1988 McMahon ............................... 370/3

FOREIGN PATENT DOCUMENTS 0092367 10/1983 European Pat. Off. .
2181921 4/1987 United Kingdom ............... 455/605

OTHER PUBLICATIONS

Cheng, et al, "Subscriber Loop Architecture", *AT&T Technical Digest*, No. 75, Sep. 1984, pp. 9–10.
Patent Abstracts of Japan, vol. 5, No. 3 (E-40) (675), Jan. 10, 1981 and JP A 55134551 (Nippon Denki K.K.) Oct. 20, 1980.
Optical Fiber Communication Conference, Technical Digest, Feb. 24–26, 1986, (Atlanta, Georgia), P. J. Duthie et al: "Simultaneous Bidirectional Fiber-Optic Transmission Using a Single Source", pp. 14–15.
Applied Physics Letters, vol. 35, No. 12, Dec. 15, 1979, American Institute of Physics (New York, U.S.A.), S. K. Sheem et al: "Polarization Effects on Single-Mode Optical Fiber Sensors", pp. 914–917.
Laser Focus, vol. 19, No. 5, May 1983, (Newton, Massachusetts, U.S.A.), S. C. Rashleigh et al: "Preservation of Polarization in Single-Mode Fibers", pp. 155–161.
Wheeler et al., "Two Way Transmission Using Electro Optic Modulator", Electrical Letters, Apr. 24, 1986, vol. 22, #9, pp. 479–481.

Primary Examiner—Reinhard J. Eisenzopf
Assistant Examiner—L. Van Beek
Attorney, Agent, or Firm—Nixon & Vanderhye

[57] ABSTRACT

A two way transmission system has a source at one terminal and a fibre loop at the other terminal. Conventional modulation techniques are used at the terminal with the source, whereas at the other terminal modulation is achieved by modulation of the birefringence of the loop.

12 Claims, 2 Drawing Sheets

OPTICAL TWO-WAY TRANSMISSION SYSTEM WITH LOOP REFLECTOR MODULATOR

BACKGROUND AND SUMMARY OF THE INVENTION

This invention relates to optical transmission systems.

In order to utilise optical fibre systems to their maximum, duplex transmission is an attractive technique. With this technique each terminal has an optical source and receiver and transmits over the same fibre link. One of the most expensive components of the system is the optical source, usually a laser, and the present invention is directed towards reducing the number of optical sources, and also to providing a convenient and simple modulation technique.

According to a first aspect of the present invention there is provided a two way transmission system comprising a first terminal having a source and a first modulation means for inputting a signal to a transmission line and a demodulator for receiving return signals from a second terminal, the second terminal comprising a demodulator and a loop reflector having a second modulation means for inputting return signals to the transmission line.

According to a second aspect of the invention there is provided a modulator especially suitable for use with a transmission system according to the first aspect of the invention comprising a fibre loop reflector with means for varying the birefringence of the loop.

BRIEF DESCRIPTION OF THE DRAWINGS

The invention is now described by way of example with reference to the accompanying drawings in which.

DETAILED DESCRIPTION OF PRESENTLY PREFERRED EXEMPLARY EMBODIMENTS

Figure 1:
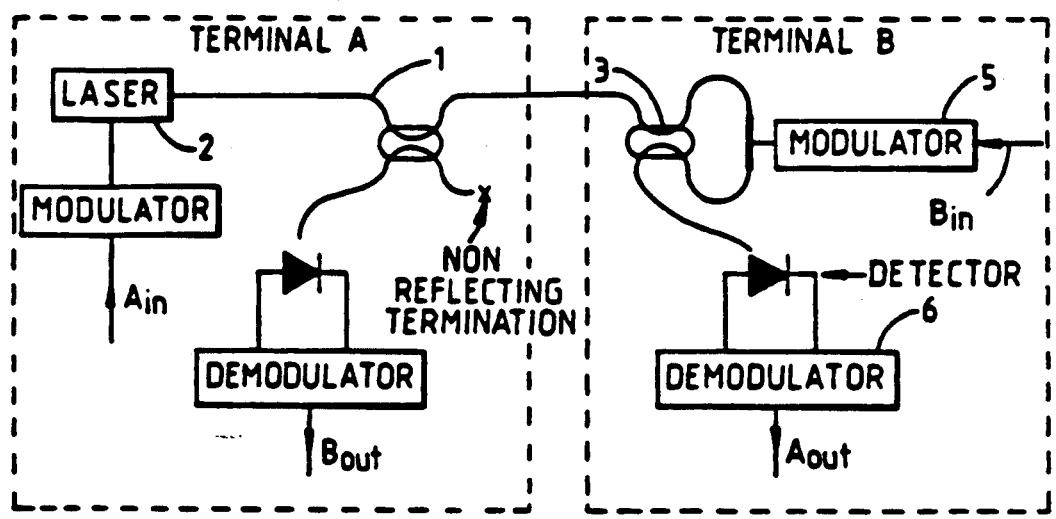
FIG. 1 shows a duplex transmission system according to an embodiment of the invention.

Referring to FIG. 1, at terminal A light is launched into the system fibre 1 from an optical source such as a laser 2. Information signals are imposed on this light at terminal A by any suitable means, for example by modulation of the source. At terminal B the system fibre enters a directional coupler 3 and is looped round to re-enter the directional coupler. The directional coupler and fibre loop is shown more clearly in FIG. 2 and its operation is discussed later.

Figure 3:
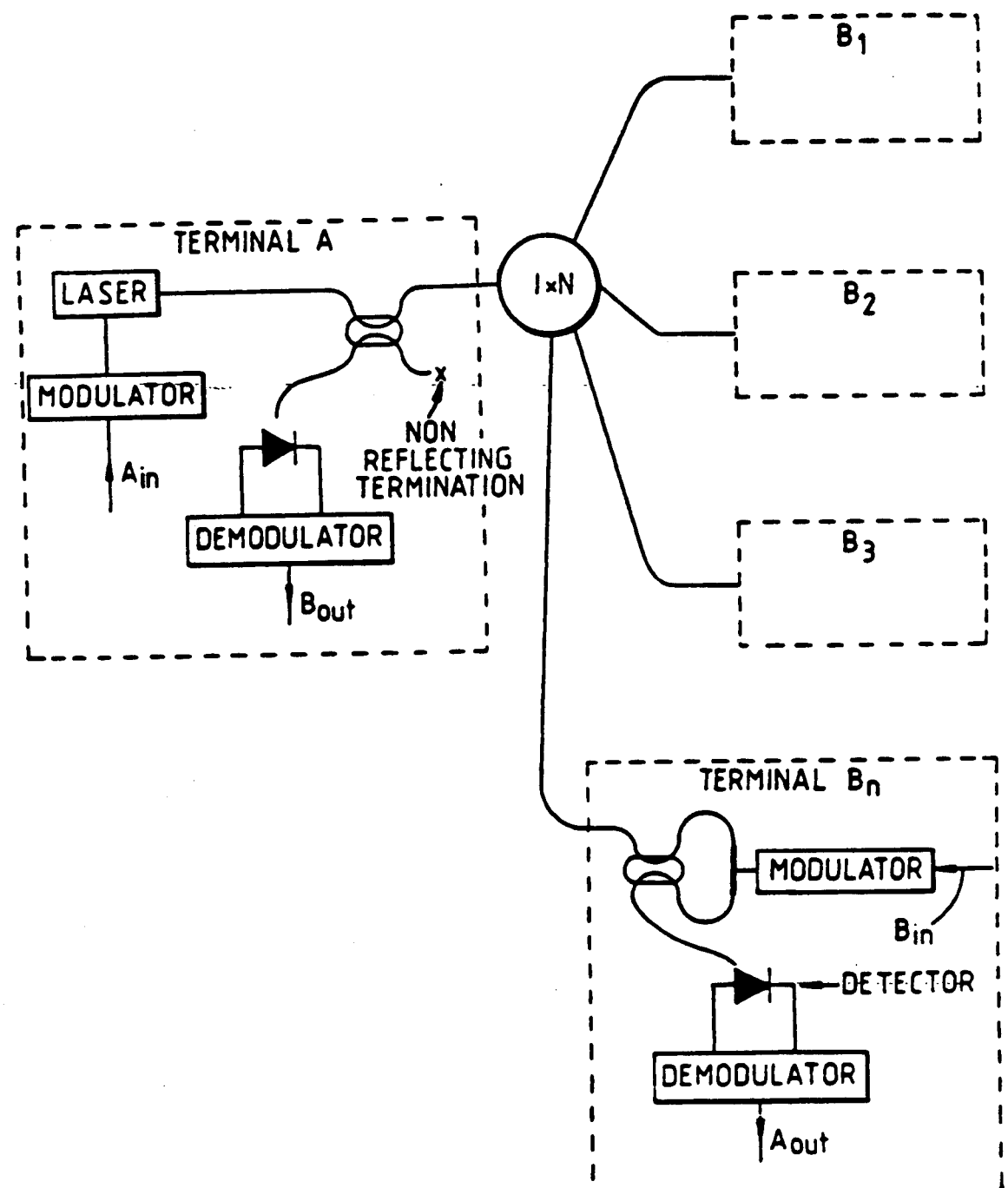
FIG. 3 shows a multi-station transmission system employing the invention.

At the coupler 3 part of the light passes straight through, traverses the loop, re-enters the coupler and part of that light continues to the demodulator 6 at B where the information from terminal A is recovered. A modulator 5 modulates the light in the loop to transmit information back to terminal A. This modulator is superimposed on the modulation from terminal A, so that the demodulators at each terminal in fact receive a doubly modulated signal, however the modulations are made sufficiently different so that each demodulator can be designed to reject the modulation that originates from its own terminal. In comparison with the usual duplex system there is a saving of one optical source. The saving can be much greater in systems with N terminals as shown in FIG. 3. Here a single laser source is used to enable duplex transmission to each of N terminals, with a star coupler interposed in the transmission line.

The operation of the fibre loop and the modulator 5 will now be described in more detail. An embodiment of a modulator according to the second aspect of the present invention comprises a fibre loop reflector which consists of a loop of optical fibre formed between the output ports of a directional coupler. Light travelling towards the coupler is split by the coupler into two counter propagating fields. By way of illustration assume these fields are of equal intensity.

Figure 2:
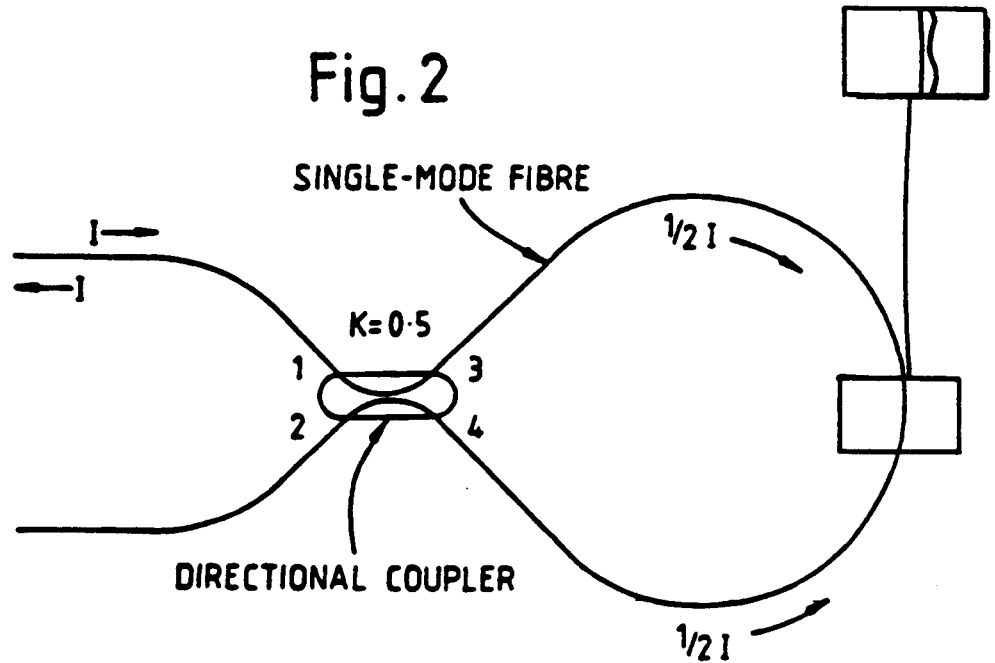
FIG. 2 shows a fibre loop reflector.

Light coupled across the waveguide suffers a $\pi/2$ phase lag with respect to light travelling straight. Consider now what happens to the clockwise (straight through) and anticlockwise (coupled across) fields on re-entry to the coupler. After the clockwise field has traversed the loop, the field is again split into straight through and coupled across fields. Likewise the counter clockwise field is also split on re-entry to the coupler. However, if the output port referenced 4 in FIG. 2 is considered it will be realized that the light intensity transmitted out of that port is the sum of the straight through component of the clockwise field and the coupled across portion of the counter clockwise field, but these are out of phase by $\pi$ and cancel out because the straight through component has remained undeviated on each entry to the coupler whereas the anticlockwise field is phase lagged $\pi/2$ by the first coupling and the coupled across component of that field is then phase lagged again.

Thus for the symmetrical coupler there is zero intensity from port 4 and from conservation of energy considerations all the input light therefore returns along the input fibre. If the coupler is made asymmetrical (that is counter-propagating fields of unequal intensity) or the loop modified then the percentage of light reflected back along the input fibre can be varied.

One method of varying the reflectivity of the fibre loop is to vary the birefringence in the loop, that is varying the optical path length of orthogonal field components. The reflectivity R can be varied following the following relationship:

$$R = (1-\tau)^2 e^{-2\alpha L}(1-K)KJ$$

where $$J = 2(|J_{xx}|^2 + 1) - (J_{yx}*J_{xy} + J_{xy}*J_{yx})$$

and K is the intensity coupling, Jqp is a Jones matrix coefficient representing the amount of birefringence in the loop, $\tau$ and $\alpha$ are the excess loss of coupler and the fibre absorption and L is the fibre length.

In the system of FIG. 1 the information for transmission from terminal B to terminal A is imposed on the light in the fibre by modulation of the birefringence of the loop. In order for some of the light to reach the demodulator 6 at B it is necessary for the loop to have a basic reflectivity less than 100%. This may be provided independently from the birefringence modulation by a constant birefringence adjustment or by other means, or may be included in the modulating means.

The birefringence of the loop can be modulated by mechanically squeezing the fibre so that for example voice modulation may be directly applied by sound wave pressure or the fibre may be positioned between an armature plate and an electromagnet or pressurised by a piezoelectric transducer. Other ways of adjusting the birefringence are also envisaged, for example the fibre may have an electro-optic portion or cladding that responds to changes in electric or magnetic field strength or intensity of electro-magnetic radiation. The sensitivity of the modulation may also be increased by tapering the fibre at the zone of modulation (as is shown in FIG. 2).

We claim:

1. A two way transmission system of the type for transmitting signals over a transmission line, said system comprising:
   a first terminal operatively coupled to said transmission line, said first terminal having a source and further including:
      a first modulation means for inputting a signal to said transmission line, and
      a first demodulator for receiving return signals from a second terminal; and
   a second terminal operatively coupled to said transmission line, said second terminal comprising:
      a further demodulator, and
      an interferometric loop reflector having a
   second modulation means for inputting return signals to the transmission line.

2. A transmission system according to claim 1 in which:
   the transmission line comprises an optical fibre; and
   the loop reflector comprises:
      a coupler having two output ports and two other ports, and
      a fibre loop connected across said two output ports, the other two ports connected to the trnsmission line and to the further demodulator, respectively.

3. A transmission system according to claim 1 in which the first demodulator rejects modulation originating from the first modulation means, and the further demodulator rejects modulation originating from said second modulation means.

4. A transmission system according to any of claims 1, 2 and 3 in which the second modulation means comprises means for varying the birefringence of the loop.

5. A transmission system according to claim 2 in which the first demodulator rejects modulation originating from the first modulation means, and the further demodulator rejects modulation originating from said second modulation means.

6. A transmission system is in claim 1 wherein: said loop reflector comprises:
   a coupler having first and second output ports and third and fourth additional ports, said transmission line being coupled to said third additional port, and
   an optical fibre coupled between said coupler first and second output ports for propagating clockwise and counterclockwise fields having phase relationships such that substantially no energy is nominally coupled from said loop to said fourth additional port and substantially all of the energy within said loop is nominally coupled to said third additional port; and
   said further modulation means is operatively coupled to said optical fiber so as to vary said phase relationships such that the amount of energy coupled to said third additional port varies.

7. A two way optical transmission system of the type for transmitting optical signals over an optical transmission network between first and second terminals, said system comprising:
   a first terminal operatively coupled to said optical transmission network, said first terminal being coupled to a light source and including:
      a first modulation means for inputting an optical signal to said optical transmission network, and
      a first optical demodulator for receiving and demodulating return optical signals from a second terminal; and
   a second terminal operatively coupled to said optical transmission network, said second terminal comprising:
      an optical fibre loop reflector,
      a second optical demodulator for receiving and demodulating optical signals from said first terminal, and
      a second optical modulation means coupled to said optical fibre loop reflector for varying the birefringence of said optical fibre loop reflector so as to vary the optical path lengths of orthogonal field components of optical signals propagating within said optical fibre loop reflector.

8. A transmission system as in claim 7 wherein: said optical fibre loop reflector comprises:
   a coupler having first and second output ports and third and fourth additional ports, said transmission network being coupled to said third additional port, and
   an optical fibre coupled between said coupler first and second output ports, said optical fibre propagating clockwise and counterclockwise fields having phase relationships such that substantially no energy is nominally coupled from said fibre to said fourth additional port and substantially all of the energy within said fibre is nominally coupled to said third additional port; and
   said second modulation means is coupled to said optical fibre and varies said phase relationships such that the amount of energy coupled from said optical fibre to said third additional port varies.

9. A two way optical transmission system of the type for transmitting optical signals over and optical transmission line between first and second terminals, said system comprising:
   a first terminal operatively coupled to said optical transmission line, said first terminal being coupled to a source producing optical signals, said first terminal including first modulation means, operatively coupled to said source and to said transmission line, for effecting input of a modulated optical signal to said optical transmission line; and
   a second terminal operatively coupled to said optical transmission line, said second terminal comprising:
      an optical fibre loop reflector coupled to said optical transmission line for receiving optical signals from said optical transmission line and for reflecting said received optical signals back onto said optical transmission line, and
      second optical modulation means for varying the reflectance of said optical fibre loop reflector, said second optical modulation means including means coupled to said optical fibre loop reflector for varying the birefringence of said optical fibre loop reflector so as to vary the optical path lengths of orthogonal field components for optical signals propagating within said optical fibre loop reflector.

10. A transmission system as in claim 9 wherein: said optical fibre loop reflector comprises:

a coupler having first and second output ports and third and fourth additional ports, said transmission line being coupled to said third additional port, and an optical fibre coupled between said coupler first and second output ports, said optical fibre propagating clockwise and counterlockwise fields having phase relationships such that substantially no energy is nominally coupled from loop reflector to said fourth additional port and substantially all of the energy within said loop reflector is nominally coupled to said transmission line; and said second modulation means is coupled to said optical fibre and varies said phase relationships such that the amount of energy coupled to said transmission line varies.

11. A two way optical transmission system of the type for transmitting optical signals between first and second terminals over an optical transmission line, said system comprising:

a first terminal operatively coupled to said optical transmission line, said first terminal including:
a laser source producing coherent optical signals,
first modulation means, operatively coupled to said source and to said transmission line, for modulating said optical signals produced by said source so as to provide modulated first optical signals,
means for coupling said modulated first optical signals to said transmission line, and
first demodulating means coupled to said transmission line for receiving modulated further optical signals from said transmission line and for demodulating said modulated further optical signals while rejecting said modulation applied by said first modulation means; and a second terminal operatively coupled to said optical transmission line, said second terminal comprising:
an optical fibre loop reflector coupled to said optical transmission line for reflecting return optical signals to the optical transmission line, said coherent optical signals being split by said loop reflector so as to cause constructive and/or destructive interference to occur,
second optical modulation means coupled to said optical fibre loop reflector for varying the reflectance of said optical fibre loop reflector so as to modulate said return signals, and
second demodulation means operative coupled to said optical transmission line for receiving said modulated first optical signals from said transmission line and for demodulating said modulated first optical signals while rejecting said modulation applied by said second modulation means.

12. A transmission system as in claim 11 wherein: said system further includes a coupler having first and second output ports and third and fourth additional ports, said transmission line being coupled to said third additional port;

said optical fibre loop reflector is coupled between said coupler first and second output ports and propagates clockwise and counterclockwise fields having phase relationships such that substantially no energy is nominally coupled from said loop reflector to said fourth additional port and substantially all of the energy within said loop reflector is nominally coupled to said third additional port; and said second modulation means is coupled to said loop reflector and varies said phase relationships such that the amount of energy coupled to said third additional port varies.

* * * * *